United States Patent
Ichieda

(10) Patent No.: US 7,797,430 B2
(45) Date of Patent: Sep. 14, 2010

(54) IMAGE DISPLAY SYSTEM, IMAGE DISPLAY DEVICE OF IMAGE DISPLAY SYSTEM, MOBILE TERMINAL DEVICE, CONNECTION ESTABLISHMENT METHOD OF IMAGE DISPLAY SYSTEM

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 782 days.

(21) Appl. No.: 11/738,255

(22) Filed: Apr. 20, 2007

(65) Prior Publication Data

US 2008/0039063 A1    Feb. 14, 2008

(30) Foreign Application Priority Data

May 19, 2006 (JP) .............................. 2006-140020

(51) Int. Cl.
*G06F 15/16* (2006.01)
(52) U.S. Cl. .................. 709/227; 709/204; 715/740; 715/753
(58) Field of Classification Search .................. 709/204, 709/205, 227–229; 715/740, 741, 753; 713/168
See application file for complete search history.

(56) References Cited

U.S. PATENT DOCUMENTS

| | | | |
|---|---|---|---|
| 2005/0036509 A1 * | 2/2005 | Acharya et al. | ............. 370/466 |
| 2006/0083404 A1 | 4/2006 | Shimosato | |
| 2006/0152595 A1 * | 7/2006 | Ryu et al. | ................ 348/220.1 |

FOREIGN PATENT DOCUMENTS

| JP | A-2006-18593 | 1/2006 |
|---|---|---|
| JP | A-2006-121185 | 5/2006 |
| WO | WO 03/015451 A1 | 2/2003 |

* cited by examiner

*Primary Examiner*—David Lazaro
(74) *Attorney, Agent, or Firm*—Oliff & Berridge, PLC

(57) ABSTRACT

An image display system is disclosed. The image display system includes an image display device forming an image and a mobile terminal device supplying image information to the image display device over a predetermined network, wherein the image display device includes: a storage unit which stores connection information for connecting to the image display device in the predetermined network; an encoding unit which encodes connection information code including the connection information; and a display unit which displays the connection information code or an image including the connection information code, and wherein the mobile terminal device includes: a code acquiring unit which acquires the connection information code from the displayed connection information code or the image including the connection information code; a code analysis unit which analyzes the connection information from the acquired connection information code; and a network connection establishment unit which establishes network connection with the image display device on the basis of the analyzed connection information.

14 Claims, 7 Drawing Sheets

IMAGE DISPLAY SYSTEM, IMAGE DISPLAY DEVICE OF IMAGE DISPLAY SYSTEM, MOBILE TERMINAL DEVICE, CONNECTION ESTABLISHMENT METHOD OF IMAGE DISPLAY SYSTEM

The entire disclosure of Japanese Patent Application No. 2006-140020, filed May 19, 2006 is expressly incorporated by reference herein.

BACKGROUND

1. Technical Field

The present invention relates to an image display device displaying an image, an image display system including a mobile terminal device supplying image information to the image display device, and a connection establishment method of the image display system.

2. Related Art

As personal computers (hereinafter, referred to as PCs), projectors and large-sized television sets come into wide use, a conference using an image expanded by a variety of devices has been frequently held. In such a conference, a projector or a large-sized television set provided in a conference room of an enterprise is mainly used.

In particular, in a conference in which many people participate, since an operation for connecting a cable to different PCs is needed whenever a person who gives a presentation is changed or lines such as cables litter up the floor unsightly, a connection method using a wireless communication network such as a wireless local area network (LAN) which does not require lines is mainly used. The wireless LAN rapidly comes into wide use in enterprises or home by the influences of low cost of corresponding devices, improvement of connectivity due to standardization of a communication method, and a wireless LAN function supported by an operating system (OS).

However, in order to project, a presentation material of a notebook type PC carried into a conference room by a projector including a wireless LAN card mounted therein, connection information necessary for connecting to the projector through a wireless LAN needs to be configured (hereinafter, referred to as "connection configuration"). The connection information includes an IP address of the projector, a plurality of identifiers including an extended service set identifier representing an access point name, and a password in a wired equivalent privacy (WEP) which is a technology of encrypting communication data.

In order to perform the connection configuration, the connection information of the projector must be previously examined. In addition, it is difficult to perform the connection configuration without a knowledge of a network configuration although the connection information is previously examined.

Recently, as mobile terminal devices such as personal digital assistants have been remarkably developed, a mobile terminal device including a wireless LAN module for connecting to a wireless LAN or a dedicated browser for displaying information on the Internet as well as a imaging unit is published in plural. Accordingly, image information of the mobile terminal device is desired to be directly displayed on a projector or a large-sized television set.

WO2003/015451 is an example of related art in order to solve such a problem.

An image display system 1-3 shown in FIG. 14 of the related art includes a projector 10-2 hanging from the ceiling of a conference room, an ID information unit for storing connection information of the projector, and a mobile terminal device 50 carried into the conference room. Each of the projector 10-2 and the mobile terminal device 50 includes a wireless LAN card for connecting to a wireless LAN or a wireless LAN module (both not shown).

Connection information of the projector 10-2 in the wireless LAN is, for example, stored in the ID information unit which is a printed material on which a RFID (Radio Frequency Identification) or a barcode is printed and attached to the body of the projector 10-2 or a lower corner of a screen SC for a projector, as shown in FIG. 14.

In the mobile terminal device 50, an ID recognizer such as a RFID reader or a barcode reader is included. Accordingly, when a mobile telephone accesses to the ID information unit by a user, the connection information of the ID information unit is read to establish network communication using the connection information. Accordingly, image information of the mobile terminal device 50 is displayed on the projector 10-2.

However, in the image display system 1-3 in the related art, a dedicated unit such as the ID information unit and the ID recognizer is required for automating network connection.

Since the mobile terminal device 50 needs to access to the ID information unit in order to read the connection information from the ID information unit, the mobile terminal device 50 moves to a place where the ID information unit is installed upon the connection and a connection operation is troublesome.

Since the projector 10-2 and the ID information unit are separately configured, the ID information unit may be attached to the screen of an adjacent conference room, that is, the ID information unit may be erroneously mounted such that the connection configuration cannot be realized.

SUMMARY

An advantage of some aspects of the invention is that it provides an image display system which has a simple configuration and convenience in use and can reliably establish connection, an image display device of the image display system, a mobile terminal device and a connection establishment method of the image display system.

According to an aspect of the invention, there is provided an image display system including an image display device forming an image and a mobile terminal device supplying image information to the image display device over a predetermined network, wherein the image display device includes: a storage unit which stores connection information for connecting to the image display device in the predetermined network; an encoding unit which encodes connection information code including the connection information; and a display unit which displays the connection information code or an image including the connection information code, and wherein the mobile terminal device includes: a code acquiring unit which acquires the connection information code from the displayed connection information code or the image including the connection information code; a code analysis unit which analyzes the connection information from the acquired connection information code; and a network connection establishment unit which establishes network connection with the image display device on the basis of the analyzed connection information.

According to an aspect of the invention, there is provided a method of establishing connection between an image display device and a mobile terminal device in an image display system including the image display device forming an image and the mobile terminal device supplying image information to the image display device over a predetermined network, the method comprising the step of: the step of displaying connection information code or an image including the connection information code obtained by encoding connection information for connecting to the image display device in the predetermined network by triggering an operation for starting the connection to the predetermined network at the image display device; the step of imaging the connection information code at the mobile terminal device; the step of analyzing the imaged connection information code at the mobile terminal device; and the step of establishing network connection with the image display device using the analyzed connection information at the mobile terminal device.

According to this configuration, the image display device stores the connection information, generates the connection information code including the connection information and displays the connection information code using the display unit. In addition, the display unit in the present invention indicates a direct viewing display such as a liquid crystal display or a plasma display or a projection unit (also called a projection lens) in the image display device forming a projected image, such as a projector.

Accordingly, the image display device of the image display system of the aspect of the invention and the connection information code including the connection information always form a pair, unlike an image display system in the related art, in which an image display device and an ID information unit for storing connection information are separated configured. Accordingly, since it is possible to prevent the connection impossibility due to mismatch between the image display device and the connection information, it is possible to improve the reliability of the connection.

When the connection information code is acquired by the code acquiring unit, the mobile terminal device analyzes the connection information from the acquired connection information code and establishes the network connection with the image display device on the basis of the analyzed connection information. The code acquiring unit can be, for example, the imaging unit which is basically mounted in the mobile terminal device such as a mobile telephone.

Accordingly, the image display system of the aspect of the invention can easily establish the network connection by the code acquiring unit and the code analysis unit without a knowledge for configuring the network, unlike the image display system in related art in which a dedicated component for automating the connection is required.

Accordingly, it is possible to provide the image display system which can reliably establish the connection and has a simple configuration and convenience in use.

According to the image display system of the aspect of the invention, the predetermined network may be any one of a wired and/or wireless local area network (LAN), Bluetooth (registered trademark), and a wireless universal serial bus (USB).

According to the method of establishing connection between an image display device and a mobile terminal device in an image display system of the aspect of the invention, the predetermined network is any one of a wired and/or wireless local area network (LAN), Bluetooth (registered trademark), and a wireless universal serial bus (USB).

Recently, as the wired and/or wireless LAN and Bluetooth (registered trademark) environment is widely used in the life environment, various types of mobile terminals in which the communication module is basically mounted are on the market. A wireless USB environment is not penetrated into the market yet, but is gradually being established.

According to this configuration, the image display system realizes the communication between the image display device and the mobile terminal device in the wired and/or wireless LAN, the Bluetooth (registered trademark), and the wireless USB environment.

Accordingly, since the network environment which is widely used and has a plurality of corresponding apparatuses is used, it is possible to simply establish a communication system with low cost.

Accordingly, it is possible to provide the image display system having a simple configuration and convenience in use.

According to the image display system of the aspect of the invention, the connection information may include a plurality of identifiers including a network name or a group name to which the image display device belongs in the predetermined network and/or a password.

According to the method of establishing connection between an image display device and a mobile terminal device in an image display system of the aspect of the invention, the connection information includes a plurality of identifiers including a network name or a group name to which the image display device belongs in the predetermined network and/or a password.

According to this configuration, the connection information includes the plurality of identifiers including the network name or the group name to which the image display device belongs and/or the password.

Accordingly, since there usually is no need to acquire necessary information for connecting to the image display device from several units, it is possible to provide the image display system having a simple configuration and convenience in use.

According to the image display system of the aspect of the invention, the connection information code may be a two-dimensional code or a three-dimensional code.

According to the method of establishing connection between an image display device and a mobile terminal device in an image display system of the aspect of the invention, the connection information code is a two-dimensional code or a three-dimensional code.

According to this configuration, since the connection information code is the two-dimensional code or the three-dimensional code, the connection information code cannot be read by a person although the connection information code is displayed by the image display device.

Accordingly, since the connection information code cannot be read by the person although the connection information code is caught by a third person, it is possible to prevent the leakage of secret information.

Accordingly, it is possible to provide the image display system having excellent security.

According to the image display system of the aspect of the invention, the code acquiring unit may be a imaging unit and acquire the connection information code from the connection information code displayed by the display unit or the image including the connection information code by remote imaging.

According to the method of establishing connection between an image display device and a mobile terminal device in an image display system of the aspect of the invention, the code acquiring unit is a imaging unit and acquires the connection information code from the connection information code displayed by the display unit or the image including the connection information code by remote imaging According to this configuration, the image displayed by the image display device is remotely imaged by the imaging unit which is the code acquiring unit of the mobile terminal device. The image display device of the image display system of the aspect of the invention may be a large-sized TV set of 28 inches long or a projector for expanding and projecting an image.

Since the image displayed by the image display device is expanded according to the size of a screen, visibility is improved and the image can be identified even at a remote place. Accordingly, the imaging that used the mobile terminal device can be performed at a distance which can identify the connection information code in the image.

Accordingly, since the connection information code can be acquired even at a remote place, it is convenient to use the image display system of the aspect of the invention.

Accordingly, it is possible to provide the image display system which is convenient in use.

According to the image display system of the aspect of the invention, the image display device may further include a password generating unit which generates a password for authenticating a counterpart device when the network connection is established.

According to the method of establishing connection between an image display device and a mobile terminal device in an image display system of the aspect of the invention, the image display device further includes a password generating unit which generates a password for authenticating a counterpart device when the network connection is established.

Although the image display device establishes the network connection on the basis of the connection information, the connection information needs to include the password. This is required for preventing invasion of a third person and preventing the leakage of secrete information so as to improve the security in a case where the secrete information of an internal important conference is displayed on the image display device.

According to this configuration, the image display device further includes a password generating unit which generates a password for authenticating a counterpart device when the network connection is established.

Accordingly, since the invasion of a third person can be prevented by the password, it is possible to improve the security of the image display system.

Accordingly, it is possible to provide the image display system having excellent security.

According to the image display system of the aspect of the invention, the password generating unit may generate a new password whenever the network connection is established.

According to the method of establishing connection between an image display device and a mobile terminal device in an image display system of the aspect of the invention, wherein the password generating unit generates a new password whenever the network connection is established.

According to this configuration, since the password generating unit generates a new password whenever the network connection is established, it is possible to improve the security of the wireless communication in the image display system.

Accordingly, it is possible to provide the image display system having excellent security.

According to another aspect of the invention, there is provided an image display device in an image display system including the image display device forming an image and a mobile terminal device supplying image information to the image display device over a predetermined network, the image display device including: a storage unit which stores connection information for connecting to the image display device in the predetermined network; and an encoding unit which encodes connection information code including the connection information; a display unit which displays the connection information code or an image including the connection information code, wherein the connection information code or the image including the connection information code is displayed before establishing network connection with the mobile terminal device.

According to this configuration, the image display device displays the connection information code or the image including the connection information code before establishing network connection. Since the image formed by the image display device is expanded and displayed according to the size of a screen, visibility is improved and the image can be identified even at a remote place.

Accordingly, the imaging that used the mobile terminal device can be performed at a distance which can identify the connection information code in the image. That is, since the connection is possible even at a remote place, it is convenient to use the image display system.

The wireless communication environment is widely used in the life environment and various types of mobile terminal devices having wireless communication are on the market.

Accordingly, since the network environment which is widely used and has a plurality of corresponding apparatuses is used, it is possible to simply establish an image display system corresponding to the wireless communication with low cost.

Accordingly, it is possible to provide the image display device of the image display system having a simple configuration and convenience in use.

According to another aspect of the invention, there is provided a mobile terminal device in an image display system including an image display device forming an image and the mobile terminal device supplying image information to the image display device over a predetermined network, the mobile terminal device including: a imaging unit which remotely image the connection information code from an image including the connection information code obtained by encoding connection information for connecting to the image display device in the predetermined network formed by the image display device, as a code acquiring unit; a code analysis unit which analyzes the connection information from the imaged connection information code; and a network connection establishment unit which establishes network connection with the image display device on the basis of the analyzed connection information.

According to this configuration, the mobile terminal device take the image including the connection information code using the imaging unit. Since the image formed by the image display device is expanded and displayed according to the size of a screen, visibility is improved and the image can be identified even at a remote place.

Accordingly, the imaging that used the mobile terminal device can be performed at a distance which can identify the connection information code in the image. That is, since the connection is possible even at a remote place, it is convenient to use the image display system.

The wireless communication environment is widely used in the life environment and various types of mobile terminal devices having wireless communication are on the market.

Accordingly, since the network environment which is widely used and has a plurality of corresponding apparatuses is used, it is possible to simply establish an image display system corresponding to the wireless communication with low cost.

Accordingly, it is possible to provide the mobile terminal device of the image display system having a simple configuration and convenience in use.

According to another aspect of the invention, there is provided a method of establishing connection between an image display device and a mobile terminal device in an image display system including the image display device forming an image and the mobile terminal device supplying image information to the image display device over a predetermined network, the method comprising: at the image display device, displaying connection information code or an image including the connection information code obtained by encoding connection information for connecting to the image display device in the predetermined network by triggering an operation for starting the connection to the predetermined network; at the mobile terminal device, imaging the connection information code; at the mobile terminal device, analyzing the imaged the connection information code; and at the mobile terminal device, establishing network connection with the image display device using the analyzed connection information.

According to this connection establishment method, since the step of displaying the connection information code including the connection information in the image display device is included, the image display device and the connection information code always form a pair.

Therefore, since it is possible to prevent the connection impossibility due to mismatch between the image display device and the connection information, it is possible to improve the reliability of the connection.

Since the step of taking the image including the connection information code and the step of analyzing and acquiring the connection information from the imaged connection information code in the mobile terminal device are included, it is possible to acquire the connection information although the image display device and the mobile terminal device are separated from each other if the mobile terminal device is in a range which can image the connection information code. Accordingly, it is possible to provide convenience in use. Accordingly, it is possible to provide a connection establishment method of the image display system which can reliably establish the connection and provide convenience in use.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the attached drawings.

Embodiment 1

Outline of First Image Display System

Figure 1:
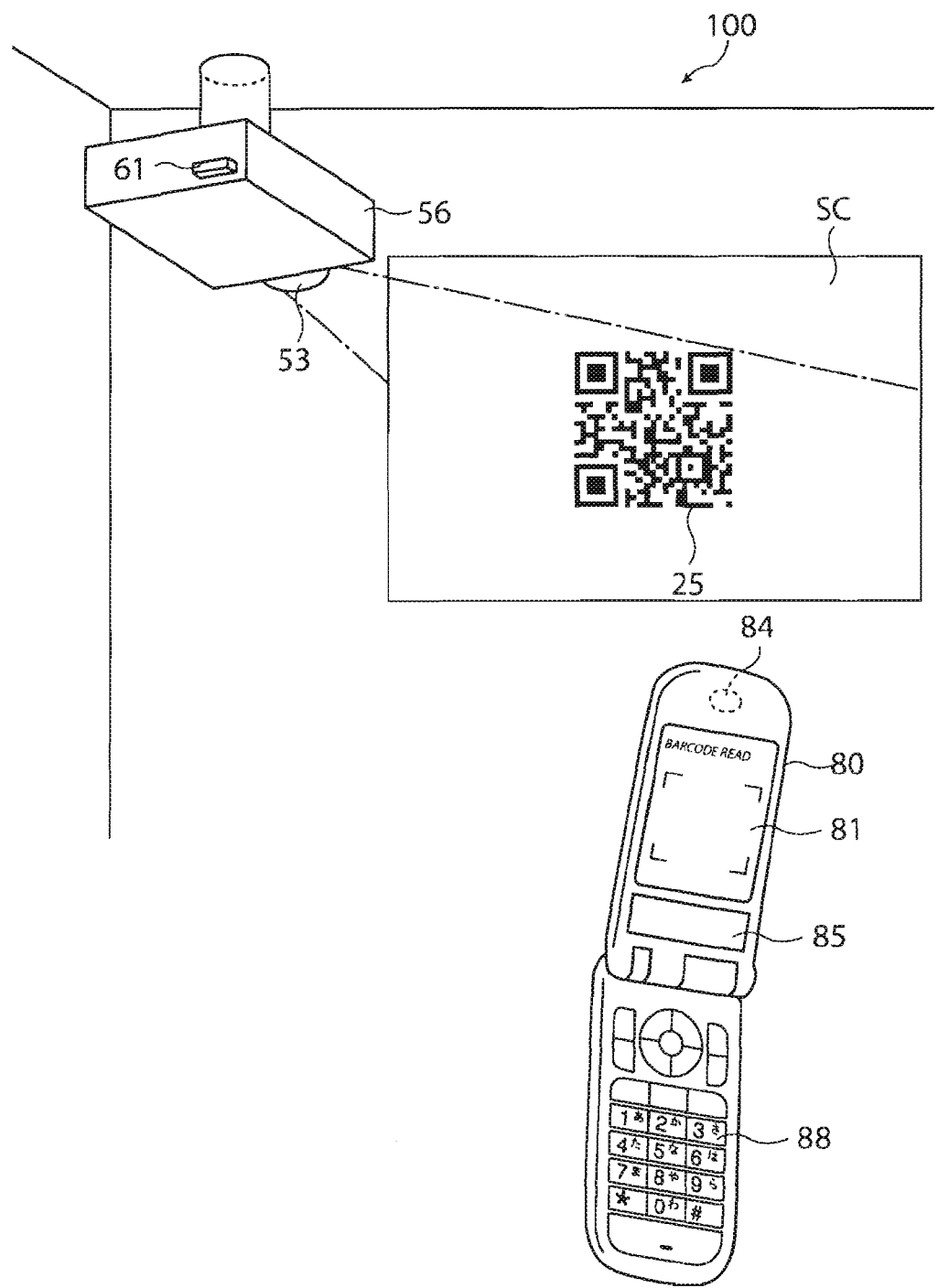
FIG. 1 is a schematic view showing the configuration of an image display system according to Embodiment 1.

FIG. 1 is a schematic view showing the configuration of an image display system 100 according to Embodiment 1. Now, the outline of the image display system 100 will be described using FIG. 1.

The image display system 100 includes a projector 56 serving as an image display device and a mobile telephone 80 serving as a mobile terminal device.

The projector 56 hangs from the ceiling of a conference room and projects an image onto a screen SC provided on a wall.

The projector 56 includes a projection lens 53 serving as a display unit for projecting an image and a communication unit 61 which is a wireless terminal device corresponding to a wireless LAN.

The projector 56 expands and projects an image including a connection information code 25 which is a two-dimensional code obtained by encoding connection information for connecting to the projector in the wireless LAN. This operation is performed by connecting to an external mobile terminal device by an attached remote controller 54 after starting up the projector 56 and executing a connection establishment P program for realizing an encoding unit or the like.

A connection establishment program including the connection establishment P program is a program for establishing the connection between the projector 56 and the mobile telephone 80 in the image display system 100 and includes a connection establishment P program installed in the projector 56 and a connection establishment M program installed in the mobile telephone 80.

The connection information includes a plurality of identifiers such as an extended service set identifier (ESSID).

The mobile telephone 80 includes a display unit 81 for displaying a variety of information, a imaging unit 84 serving as a code acquiring unit, an Mb communication unit 85 serving as a network connection establishment unit, and an Mb operation unit 88 including a plurality of operation buttons.

When an operation for connecting to an external image display device is performed by the Mb operation unit 88, the mobile telephone 80 executes the connection establishment M program for realizing a code analysis unit or the like. Accordingly, the imaging unit 84 which is a CCD camera of the mobile telephone 80 is in an imaging mode. When the connection information code 25 is taken an image by a user located at a position which can view the connection information code 25, the imaging two-dimensional code is analyzed to extract connection information and the connection with the projector 56 is established through the Mb communication unit 85 on the basis of the connection information. The connection embodiment of FIG. 1 shows an ad hoc mode for directly connecting an electronic apparatuses without using an access point in a wireless LAN environment.

According to the image display system 100, the connection between the projector 56 and the mobile telephone 80 is established through the wireless LAN.

Schematic Configuration of Projector and Mobile Telephone

Figure 2:
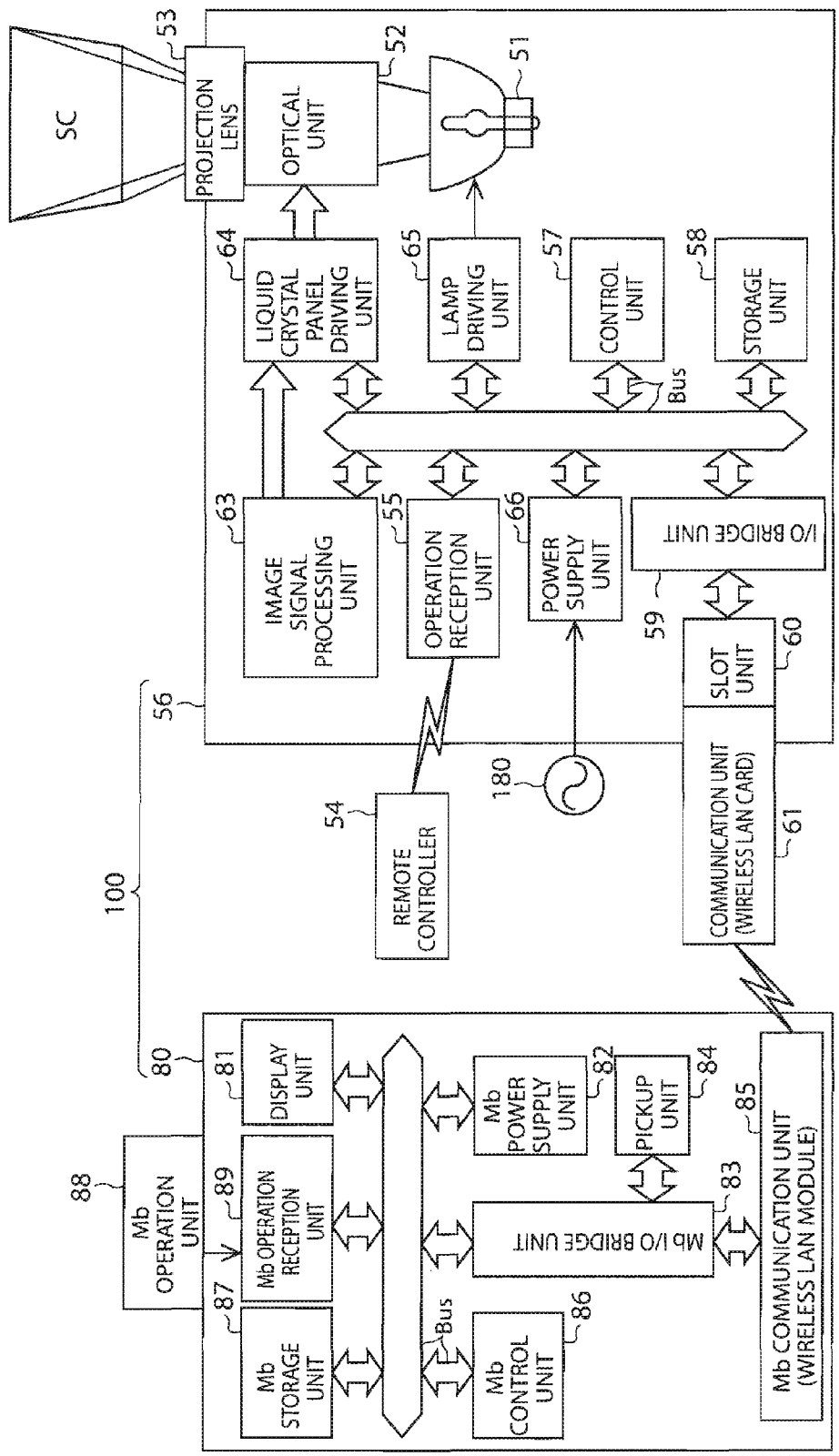
FIG. 2 is a schematic view showing the configuration of a projector and a mobile telephone in the image display system.

FIG. 2 is a schematic view showing the configuration of the projector and the mobile telephone in the image display system. Now, the schematic configuration of the projector 56 and the mobile telephone 80 will be described with reference to FIGS. 1 and 2.

The projector 56 is a so-called "3-LCD projector" which modulates light emitted from a light source unit 51 using a discharge lamp such as a high-pressure mercury lamp or a metal halide lamp as a light source according to an image signal by an optical unit 52 including three liquid crystal light valves (not shown) which are optical modulation devices of red light, blue light and green light and expands and projects the modulated light representing the modulated image from the projection lens 53.

The projector 56 includes the light source unit 51, the optical unit 52, a remote controller 54, an operation reception unit 55, a control unit 57, a storage unit 58 serving as a storage unit, an I/O bridge unit 59, a slot unit 60, a communication unit 61, an image signal processing unit 63, a liquid crystal panel driving unit 64, a lamp driving unit 65, a power supply unit 66.

The light source unit 51 includes the high-brightness discharge lamp such as the high-pressure mercury lamp or the metal halide lamp and a reflector for focusing light emitted from the discharge lamp and emitting the light the optical unit.

The optical unit 52 includes an integrator optical system for converting the light from the light source unit 51 into light having a stable brightness distribution, a division optical system for dividing the light from the light source unit 51 into colored light components of red, green and blue, which are three primary light colors, and supplying the colored light components to liquid crystal light valves for colored lights, and a synthesis optical system for synthesizing the respective modulated colored lights according to an image signal of each colored light by the liquid crystal light valves for colored lights, all of which are not shown.

The projection lens 53 is a wide-angle zoom lens which expands and projects the modulated light emitted from the optical unit 52 and emits a full-color image onto the screen SC.

The remote controller 54 is a remote controller for remote controlling the projector 56 and includes a plurality of operation buttons (not shown). Even in the main body of the projector 56, an operation (not shown) including a plurality of operation buttons is provided.

The operation reception unit 55 is a reception circuit including a light receiving circuit for receiving infrared signal from the remote controller 54 and receives an operation and transmits an operation signal for triggering a variety of operations to the control unit 57 when the operation from the remote controller 54 is performed. The operation signal includes a start-up signal for starting up the projector 56.

The control unit 57 is a central processing unit (CPU) for transmitting/receiving a signal to/from the units through a bus line Bus and controls the operation of the projector 56.

The storage unit 58 includes a non-volatile memory such as a mask ROM, a flash memory or FeRAM. The storage unit 58 stores a variety of control programs for controlling the operation of the projector 56 or firmware and attendant data.

The control program includes a connection establishment P program for defining the sequence and the contents of a process of connecting to an external mobile terminal device. The connection establishment P program contains a code generating program, which is the encoding unit for encoding the connection information, as a subroutine.

As a code generated by the code generating program, a two-dimensional code such as the QR code (registered trademark) (made by Denso Wave Incorporated) which is the connection information code 25 shown in FIG. 1 is suitably used. The two-dimensional code may be a matrix type two-dimensional code or a stack type two-dimensional code in which barcodes are stacked, in addition to the QR code (registered trademark). In addition, a three-dimensional code obtained by changing the two-dimensional code in time series. In the present embodiment, the code will be described using the QR code (registered trademark).

The attendant data includes the connection information including a plurality of identifiers for connecting to the projector 56 in the wireless LAN. The connection information includes an identifier of a wired equivalent privacy (WEP) for encrypting information indicating whether an IP address or a dynamic host configuration protocol (DHCP) is used, an access mode, a subnet mask, a default gateway, and communication data, in addition to the above-described ESSID.

The I/O bridge unit 59 is a south bridge and includes a variety of device controllers such as a USB controller and a peripheral component interconnect (PCI) controller.

The slot unit 60 is an expansion card corresponding to the PCI bus connected to the I/O bridge unit 59. In the slot unit 60, the communication unit 61 is set. The I/O bridge unit 59 also includes a USB port 90.

The communication unit 61 is a wireless terminal device corresponding to a wireless LAN and is a wireless LAN card corresponding to the wireless LAN standard such as the IEEE802.11b (IEEE802.11 High-Rate Direct Sequence), IEEE802.11g, or IEEE802.11a. The communication unit 61 may be a wireless terminal device which can be connected to a wireless LAN, for example, a wireless LAN adapter set in the USB port or a wireless LAN module which is previously included in the projector 56.

The image process unit 63 is an image processor which performs various image processes such as screening on an image signal in order to convert the image signal supplied through an input terminal (not shown) or the I/O bridge unit 59 into an image signal (information) which can be suitably projected by the projector 56. The liquid crystal panel driving unit 64 is a liquid crystal driver which supplies an image signal and a driving voltage to the three liquid crystal light valves (not shown) for colored lights and allowing the liquid crystal light valves to emit an image.

The lamp driving unit 65 is an ignition control circuit for controlling the ON/OFF of the light source unit 51 and includes an igniter circuit for generating a high voltage and forming a discharge path for ignition and a ballast circuit for maintaining a stable ignition state after ignition, all of which are not shown.

The power supply unit 66 leads an AC voltage from an external power supply 180 through a plug and performs transformation, rectification and smoothing in a built-in AC/DC conversion unit (not shown), and supplies a stable DC voltage to the units of the projector 56.

Subsequently, the schematic configuration of the mobile telephone 80 will be described.

The mobile telephone 80 includes a display unit 81, an Mb power supply unit 82, an Mb I/O bridge unit 83, a imaging unit 84, an Mb communication unit 85 serving as the network connection establishment unit, an Mb control unit 86, an Mb storage unit 87, an Mb operation unit 88, and an Mb operation reception unit 89.

The display unit 81 is, for example, an active matrix driving type color liquid crystal panel using a thin-film transistor.

The Mb power supply unit 82 is, for example, a charging type lithium ion battery which stores power supplied from an external power supply and supplies the units of the Mb power supply unit 82.

The Mb I/O bridge unit 83 is a south bridge and includes a variety of device controllers such as a USB controller.

The imaging unit 84 is a CCD camera including a CCD as a imaging device. The imaging device is a device which can taking an image, such as a CMOS image sensor.

The Mb communication unit 85 is a wireless terminal device which can be connected to a wireless LAN and corresponds to the wireless LAN standard such as IEEE802.11b, IEEE802.11g, or IEEE802.11a. The Mb communication unit 85 may be a wireless LAN adapter which is a wireless LAN terminal device set in a USB port.

The Mb control unit 86 is a CPU for transmitting/receiving a signal to/from the units through a bus line Bus and controls the operation of the mobile telephone 80.

The Mb storage unit 87 includes a non-volatile memory such as a mask ROM, a flash memory or FeRAM. The Mb storage unit 87 stores a variety of control programs for controlling the operation of the mobile telephone 80 or firmware and attendant data. The control program includes a connection establishment M program for defining the sequence and the contents of a process of connecting to an external image forming device. The connection establishment M program contains a code analysis program, which is the code analysis unit for analyzing a connection information code included in an image imaged by the imaging unit 84 and extracting connection information, as a subroutine. In the present embodiment, the code analysis program is the QR code (registered trademark) analysis program. The Mb operation unit 88 is an operation panel including a plurality of operation buttons for operating the mobile telephone 80.

The Mb operation reception unit 89 receives an operation and transmits an operation signal for triggering a variety of operations to the Mb control unit 86 when the operation of the Mb operation unit 88 is performed.

Flow of Connection Process

Figure 3:
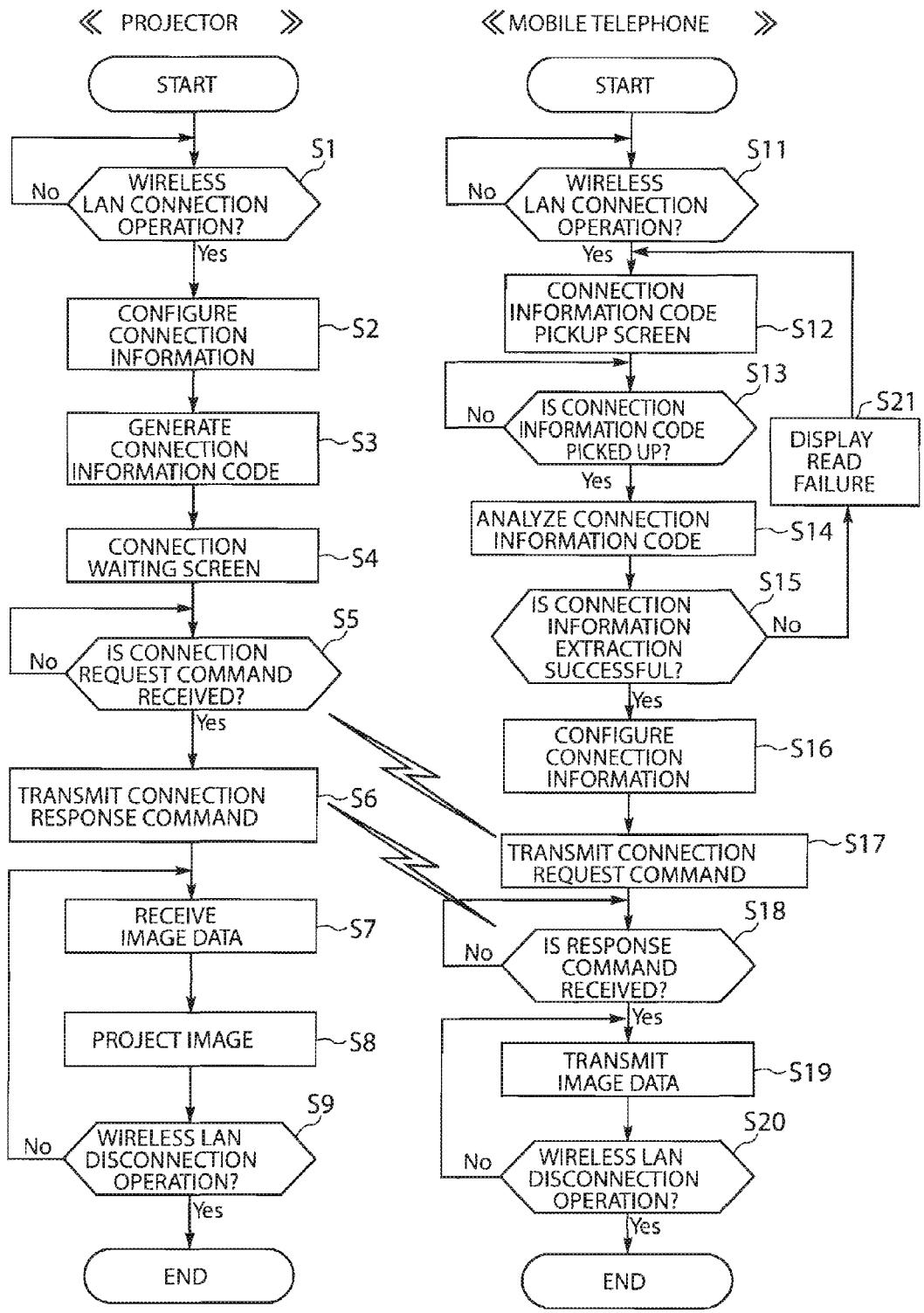
FIG. 3 is a flowchart illustrating a method of connecting the projector and the mobile telephone according to the embodiment of the invention.

FIG. 3 is a flowchart illustrating a method of connecting the projector and the mobile telephone in the image display system according to Embodiment 1 of the invention.

The left side of FIG. 3 is a flowchart showing the operation of the projector 56 and the right side thereof is a flowchart showing the operation of the mobile telephone 80 corresponding thereto.

Now, the flow of connecting the projector 56 hanging from the ceiling of the conference room as shown in FIG. 1 and the mobile telephone 80 carried into the conference room using the wireless LAN will be described with reference to FIGS. 1 to 3.

First, the flowchart of the projector 56 will be described. The projector 56 starts up by the starting-up operation of the remote controller 54 and becomes a standby state after initiation, In a step S1, the control unit 57 waits for an operation for starting the connection with an external mobile terminal device. In particular, the control unit 57 waits for an operation signal from the operation reception unit 55 by performing an operation for starting the connection with the external mobile terminal device by the remote controller 54. When the connection start operation is performed, the method progresses to a step S2. When the connection start operation is not performed, the connection start operation is continuously waited.

In the step S2, the control unit 57 reads connection information from the storage unit 58 and configures the connection information in the communication unit 61. Here, since the connection establishment M program is executed by the connection start operation in the step S1, a process of entering the projector 56 into the wireless LAN environment is performed as a first process of the program. The following steps are executed by this program. The connection information in the wireless LAN environment shown in FIG. 1 includes an identifier representing an ad hoc mode as an access mode.

In a step S3, the control unit 57 executes the code generating program and generates the connection information code. The connection information code generated in the present embodiment is the QR code (registered trademark).

In a step S4, the control unit 57 allows the image processing unit 63 to generate an image including the generated connection information code and to project the image as a connection standby screen. This state is displayed on the screen SC of FIG. 1. The size when a square cell which is a minimum unit for configuring the QR code (registered trademark) is one pixel of the liquid crystal light valve for determining the resolution of the projected image is set to a minimum size and the connection information code 25 has a size larger than and equal to the minimum size.

The implication of the projected image and a string for urging a next connection operation may be displayed in a blank portion of the projected image. As the string, "Photograph the QR code (registered trademark) when the connection is performed by the wireless LAN" may be displayed. Accordingly, it is possible to improve a user interface.

In a step S5, the control unit 57 checks whether a connection request command for requesting the connection using the wireless LAN is received from the mobile telephone 80. When the connection request command is received, the method progresses to a step S6. When the connection request command is not received, the connection request command is continuously waited.

In a step S6, the control unit 57 transmits a connection response command for allowing the connection to the mobile telephone 80 through the communication unit 61.

In a step S7, the control unit 57 receives image data from the connected mobile telephone 80.

In a step S8, the control unit 57 allows the image processing unit 63 to project the received image data.

In a step S9, the control unit 57 checks whether there is a disconnection operation of the remote controller 54 or a disconnection request from the mobile telephone 80. In particular, an operation signal from the operation reception unit 55 or a disconnection request command transmitted through the I/O bridge unit 59 is checked. When the disconnection operation is performed, the wireless LAN is disconnected and a standby state is returned. When the disconnection operation is not performed, the method returns to the step S7.

Subsequently, the flowchart of the mobile telephone 80 will be described.

In a step S11, the Mb control unit 86 waits for an operation for starting the connection with an external projector. In particular, an operation signal from the Mb operation reception unit 89 is waited. When the connection start operation is performed, the method progresses to a step S12. When the connection start operation is not performed, the connection start operation is continuously waited.

As the connection start operation, for example, when the operation hierarchy of an operation menu of the mobile telephone 80 are displayed, a menu "connection with other device" is first selected and the "icon of a projector" is selected from among the icons of a PC, a projector and a digital TV set.

By this operation, the connection establishment M program is executed. The following steps are executed by this program.

In the step S12, the Mb control unit 86 sets the display unit 81 to a connection information code imaging screen and urges the imaging using the imaging unit 84. The connection information code imaging screen is, for example, a screen displayed on the display unit 81 of the mobile telephone 80 of FIG. 1, on which characters "barcode read" are displayed at the upper side thereof and an empty space for imaging the connection information code 25 is displayed below the characters. On four corners of the empty space, brackets for defining the size of the imaged connection information code 25 are displayed. A imaging distance is about 1 m by the size of the projected connection information code 25 and the function of the imaging unit 84. When a projection screen is 50 inches or more and the connection information code 25 is displayed in a space having a size of ¼ of the screen or when the imaging unit 84 includes a zoom function, the imaging of a farther remote place than 10 m is possible.

In a step S13, the Mb control unit 86 checks whether the imaging operation of the connection information code is performed. When the imaging operation is performed, the method progresses to a step S14. When the imaging operation is not performed, the imaging operation is continuously waited.

In the step S14, the Mb control unit 86 executes the code analysis program and analyzes the connection information code included in the taken image.

In a step S15, the Mb control unit 86 checks whether the connection information is extracted by analyzing the connection information code. When the connection information is extracted, the method progresses to a step S16. When the connection information is not extracted, the method progresses to a step S21.

In the step S16, the Mb control unit 86 configures the extracted connection information in the Mb communication unit 85. In this step, for example, an operation progress such as "read success" and "under connection" may be displayed, like the screen displayed on the display unit 81 of the mobile telephone 80 shown in FIG. 4. Accordingly, it is possible to improve the user interface. The connection information code 25 when the imaging is suitably performed is displayed in the bracket on the screen of the display unit 81. It is possible to improve extraction reliability of the connection information by imaging the connection information code 25 such that the connection information code is filled in the bracket.

In a step S17, the Mb control unit 86 transmits the connection request command for requesting the connection using the wireless LAN to the projector 56.

In a step S18, the Mb control unit 86 checks whether a connection response command for allowing the connection is received from the projector 56. When the connection response command is received, the method progresses to a step S19. When the connection response command is not received, the connection response command is continuously waited. In FIG. 1, the connection using the ad hoc mode is established at a timing when the connection response command is received.

In a step S19, the Mb control unit 86 transmits the image data to the projector 56 through the Mb communication unit 85.

In a step S20, the Mb control unit 86 checks whether the disconnection operation of the Mb operation unit 88 is performed. When the disconnection operation is performed, the wireless LAN is disconnected and the standby state is returned. When the disconnection operation is not performed, the method returns to the step S19.

Subsequently, a case where the connection information cannot be extracted in the step S15 will be described.

In the step S21, the Mb control unit 86 displays a state that the read fails for a predetermined time on the display unit 81 and the method then returns to the step S12. The display of the read failure may be, for example, "Read failure" or "Imaging an image again" so as to display the necessity of the imaging.

In the steps, when an operation for interrupting a process such as a reset operation is performed, the projector 56 and the mobile telephone 80 receives the operation even at any timing.

Other Connection Embodiment

Figure 4:
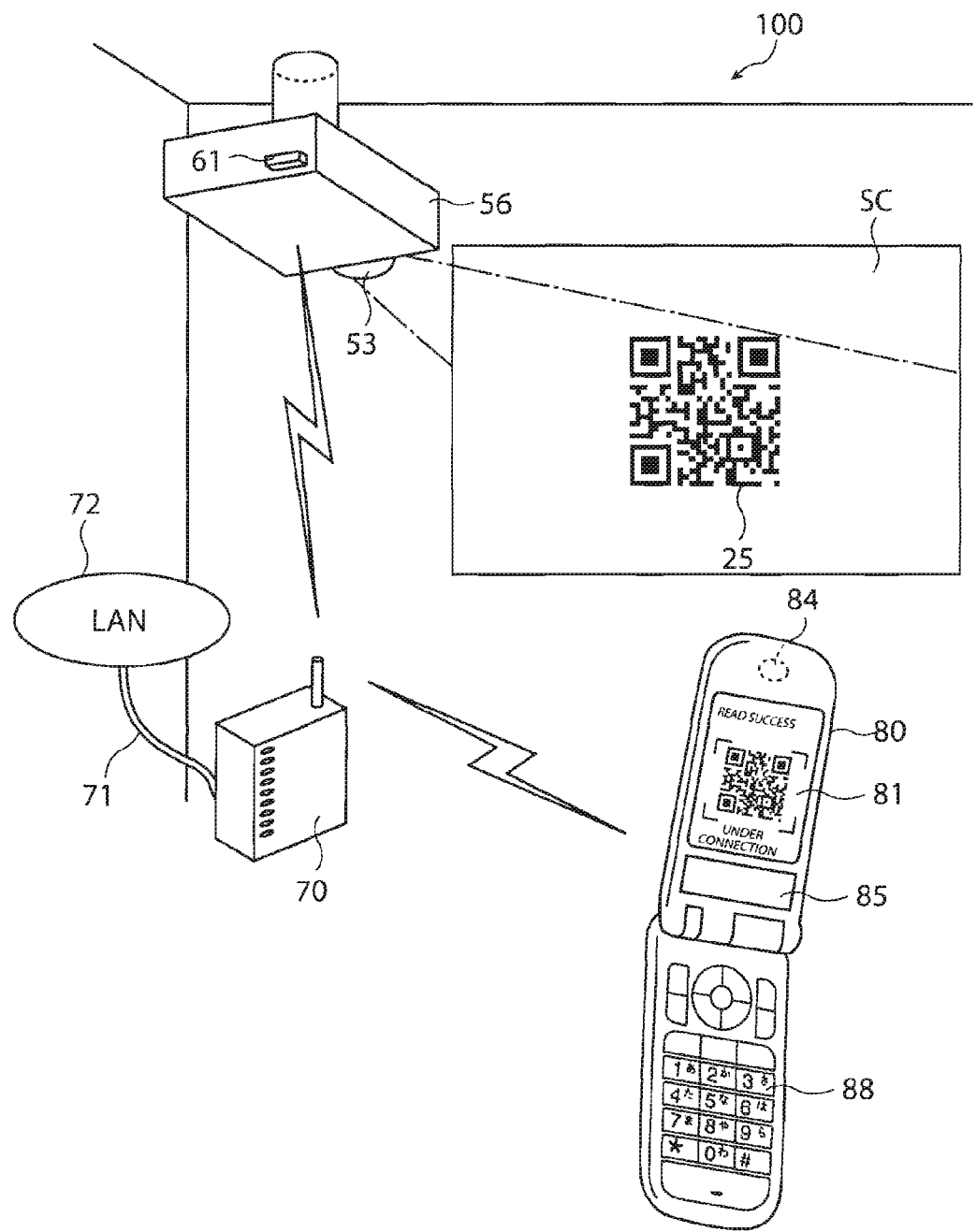
FIG. 4 is a schematic view showing the configuration of the image display system in a wireless LAN environment according to another connection embodiment.

FIG. 4 is a schematic view showing the configuration of the image display system 100 in a wireless LAN environment according to a connection embodiment different from the above-described connection embodiment.

A wireless LAN environment of FIG. 4 is provided by a router 70 which is an access point in a wireless LAN. The router 70 is always connected to a specific LAN such as an in-house PC network by a wired cable 71.

The hardware configuration of the projector 56 and the mobile telephone 80 of the image display system 100 provided in this environment is shown in FIG. 2. As software, the connection establishment P program is installed in the projector 56 and the connection establishment M program is installed in the mobile telephone 80.

The present embodiment is different from the above-described embodiment in an infrastructure mode in which the identifier of an access mode in the connection information stored in the projector 56 is transmitted through a predetermined access point.

In the wireless LAN environment of FIG. 4, when the connection method of FIG. 3 is performed, the connection between the projector 56 and the mobile telephone 80 using the wireless LAN is established through the router 70.

In FIG. 4, the router 70 and the projector 56 are wireless-connected and may be always connected by a wired cable. The projector 56 may be directly connected to the LAN by a wired cable from the specific LAN without using the router 70.

By these configurations, it is possible to establish the connection between the projector 56 and the mobile telephone 80 by the connection method shown in FIG. 3.

As described above, according to the present embodiment, the following effects are obtained.

(1) The projector 56 stores the connection information in the storage unit 58, generates the connection information code including the connection information, and projects an image through the projection lens 53.

Accordingly, the projector 56 of the image display system 100 according to the embodiment of the invention and the connection information code including the connection information forms a pair. Therefore, since it is possible to prevent the connection impossibility due to mismatch between the projector 56 and the connection information, it is possible to improve the reliability of the connection.

When the connection information code is imaged by the imaging unit 84, the mobile telephone 80 analyzes the image including the imaging connection information code and extracts the connection information. The extracted connection information is configured to the Mb communication unit 85 in access the projector 56.

As described above, since the imaging unit is included in the configuration of the general mobile telephone, it is possible to realize the code acquiring unit by the imaging unit which is the existing component. Accordingly, a special hardware configuration is not required in the mobile telephone 80.

When the projector 56 and the mobile telephone 80 are separated from each other, it is possible to establish the connection without movement if the imaging unit 84 can imaging the connection information code and thus to provide convenience in use.

Accordingly, it is possible to provide the image display system 100 which can reliably establish the connection and has a simple configuration and convenience in use.

(2) The image display system 100 realizes the communication between the projector 56 and the mobile telephone 80 in the wireless LAN environment which is a popularized network technology.

Accordingly, it is possible to simply establish a system with low cost in the wireless LAN environment which is widely used and has a plurality of corresponding apparatuses.

It is possible to use the projector including the wireless LAN card as a standard configuration and the mobile telephone including the wireless LAN module as a standard configuration without alteration.

Accordingly, it is possible to provide the image display system 100 having a simple configuration and convenience in use.

(3) Since the connection information code is the two-dimensional code or the three-dimensional code obtained by encoding the connection information, the connection information code cannot be read by a person although the connection information code is projected and displayed by the projector 56.

Accordingly, it is possible to prevent a third person who participates in a conference from being informed of the connection information, that is, to prevent information leakage.

Accordingly, it is possible to provide the image display system 100 which can prevent the leakage of the connection information.

(4) Since the encoding unit is realized by the code generating program for generating the two-dimensional code or the three-dimensional code executed by the projector 56 and the connection establishment P program including the program, the projector 56 does not require a dedicated hardware configuration for generating the two-dimensional code or the three-dimensional code.

Similarly, since the code analysis unit is realized by the code analysis program for analyzing the two-dimensional code or the three-dimensional code executed by the mobile telephone 80 and the connection establishment M program including the program, the mobile telephone 80 does not require a dedicated hardware configuration for generating the two-dimensional code or the three-dimensional code.

Accordingly, it is possible to provide the image display system having a simple configuration.

(5) The image display system 100 includes the projector 56 and the mobile telephone 80. Since the image projected by the projector 56 is expanded, visibility is improved. Accordingly, although the mobile telephone 80 is located at a remote place, the connection information code can be imaged if the mobile telephone is separated by a distance for allowing the connection information code in the projected image to be taken the imaging.

Accordingly, since the connection information code can be acquired at the remote place, it is convenient to use the image display system 100.

Accordingly, it is possible to provide the image display system which is convenient in use.

(6) Since the connection information such as the identifier of the access mode is configured to be suitable for the wireless LAN environment in which the image display system 100 is used, it is possible to establish the connection between the projector 56 and the mobile telephone 80 even in any of the ad hoc mode or the infrastructure mode.

Accordingly, the image system 100 is convenient in use because a use environment is not selected.

Accordingly, it is possible to provide the image display system which can reliably establish the connection and is convenient in use.

Embodiment 2

Outline of Second Image Display System

Figure 5:
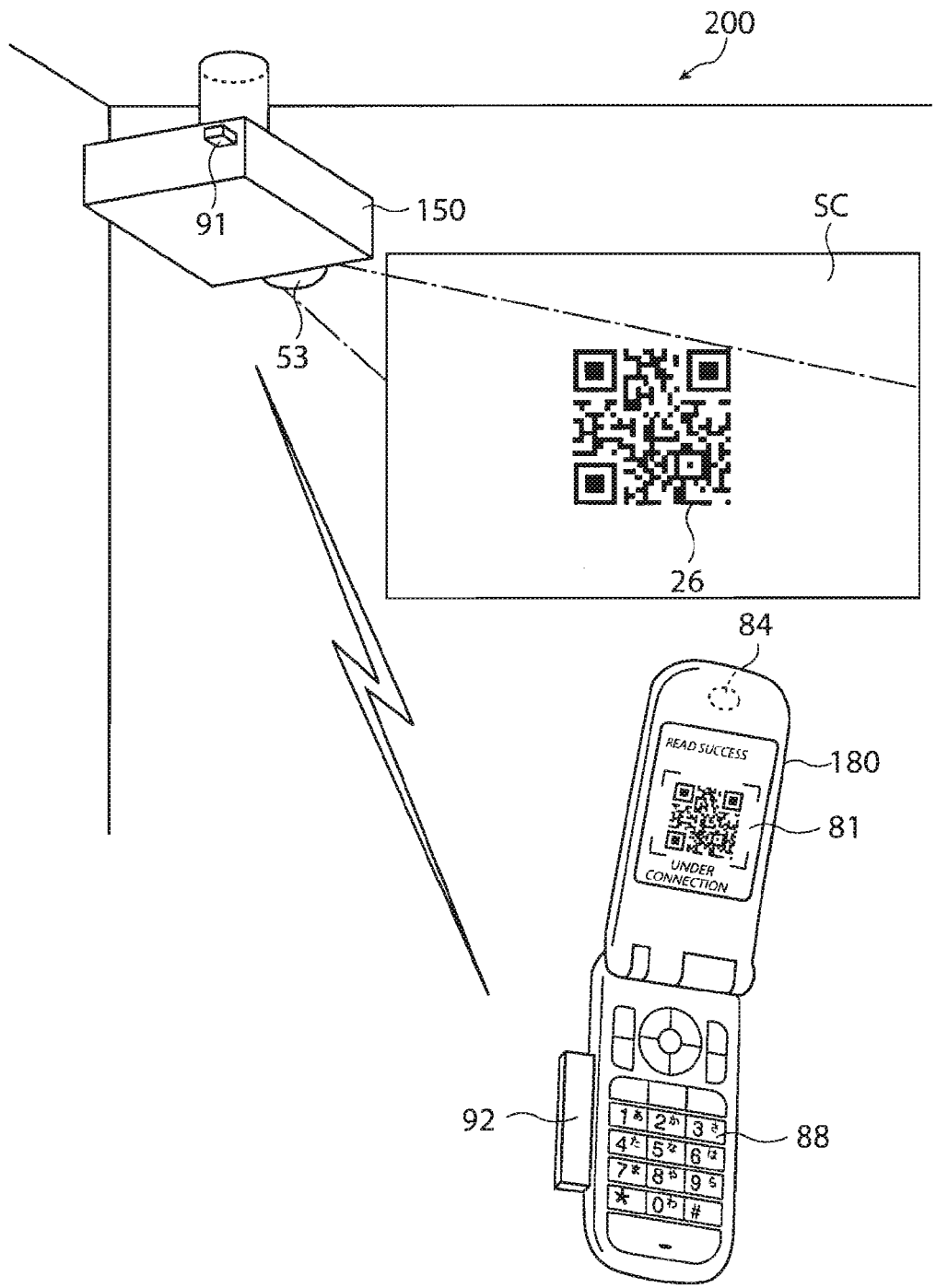
FIG. 5 is a schematic view showing the configuration of an image display system according to Embodiment 2.

FIG. 5 is a schematic view showing an image display system 200 according to Embodiment 2 of the invention. Now, the outline of the image display system 200 will be described with respect to FIGS. 5 and 1. The image display system 200 includes a projector 150 serving as an image display device and a mobile telephone 180 as a mobile terminal device.

While the connection between the projector 56 and the mobile telephone 80 is established by the wireless LAN as a predetermined network in the image system 100 (FIG. 1) of Embodiment 1, the connection between the projector 150 and the mobile telephone 180 is established by a wireless USB as a predetermined network in the image system 200. The wireless USB is a wireless communication technology based on the certified wireless USB obtained by converting a universal serial bus (USB), which is the standard of the transmission channel using a wired cable, into a wireless USB.

The image system 200 includes a configuration for wireless communication using the wireless USB. In the wireless USB, hardware information of the wireless USB terminal device or a security ID needs to be exchanged as an initial configuration. In Embodiment 2, as an initial configuration, the projector 150 and the mobile telephone 180 are USB-connected by the wired cable and the hardware information or the security ID is previously exchanged.

However, for simplification of the description, the same components as the image system 100 are denoted by the same reference numerals and differences between the image system 200 and the image system 100 will be described.

The projector 150 includes a W communication unit 91 which is a wireless USB terminal device corresponding to the wireless USB.

The projector 150 expands and projects an image including a connection information code 26 which is a two-dimensional code obtained by encoding a password for authenticating a counterpart device in the wireless USB.

This operation is performed by connecting to an external mobile terminal device by an attached remote controller 54 after starting up the projector 150 and executing a connection establishment Q program including a code generating program for realizing the encoding unit or the like.

A connection establishment program including the connection establishment Q program is a program for establishing the connection between the projector 150 and the mobile telephone 180 in the image display system 200 and includes a connection establishment Q program installed in the projector 150 and a connection establishment N program installed in the mobile telephone 180.

The password is generated by the projector 150 in each connection and authentication is performed a new password in each session.

The mobile telephone 180 includes a mobile W communication unit 92 which is a wireless USB terminal device corresponding to the wireless USB as the network connection establishment unit.

When an operation for connecting to an external image display device is performed by the Mb operation unit 88, the mobile telephone 180 executes the connection establishment N program for realizing the code analysis unit or the like.

Accordingly, the imaging unit 84 of the mobile telephone 180 is in a imaging mode. When the connection information code 26 is taken the image by a user located at a position which can view the connection information code 26, the imaging two-dimensional code is analyzed to extract a password and the password is transmitted through mobile W communication unit 92 to establish the connection with the projector 150. According to the image display system 200, the connection between the projector 150 and the mobile telephone 180 are established using the wireless USB.

Schematic Configuration of Projector and Mobile Telephone

Figure 6:
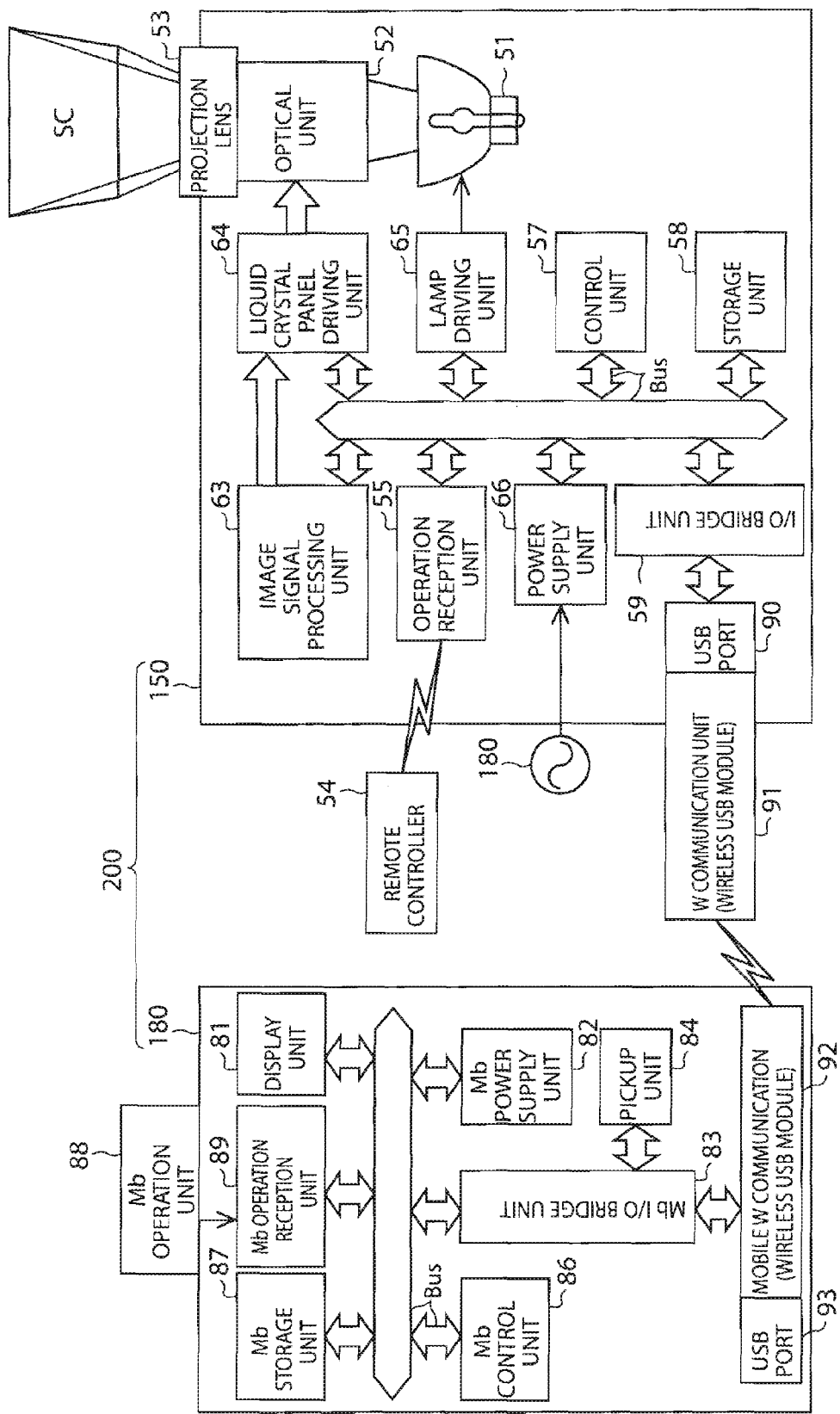
FIG. 6 is a schematic view showing the configuration of a projector and a mobile telephone in the image display system.

FIG. 6 is a schematic view showing the configuration of a projector and a mobile telephone in the image display system. Now, the schematic configuration of the projector 150 and the mobile telephone 180 will be described with reference to FIGS. 2 and 6. The same components as the image display system 100 according to Embodiment 1 are denoted by the same reference numerals and the description thereof will be omitted.

The schematic configuration of the projector 150 will be described.

The storage unit 58 stores the connection establishment Q program for establishing the connection between the projector 150 and the mobile telephone 180 by the wireless USB.

The connection establishment Q program includes a plurality of subroutines such as a password generating program which is a password generating unit for generating the password for authenticating a counterpart device upon wireless communication and a code generating program which is the encoding unit for encoding the generated password.

The password generating program, for example, generates a password using a random number.

The code generating program is a program for generating the two-dimensional code or the three-dimensional code and encodes the password to generate the connection information code. The connection information code may include connection information other than the password.

The I/O bridge unit 59 is connected to a USB port 90. The USB port 90 includes the W communication unit 91 which is the wireless USB terminal device.

Subsequently, the schematic configuration of the mobile telephone 180 will be described.

The Mb I/O bridge unit 83 includes a USB port 93. The USB port 93 includes the mobile W communication unit 92 which is the wireless USB terminal device.

The Mb storage unit 87 stores the connection establishment N program for establishing the connection between the projector 150 and the mobile telephone 180 by the wireless USB.

The connection establishment N program includes a code analysis program for analyzing the connection information code included in the taken image by the imaging unit 84 and extracting the password as a subroutine. The code analysis program serving as the code analysis unit is a program for analyzing the two-dimensional code or the three-dimensional code.

Flow of Connection Process

Figure 7:
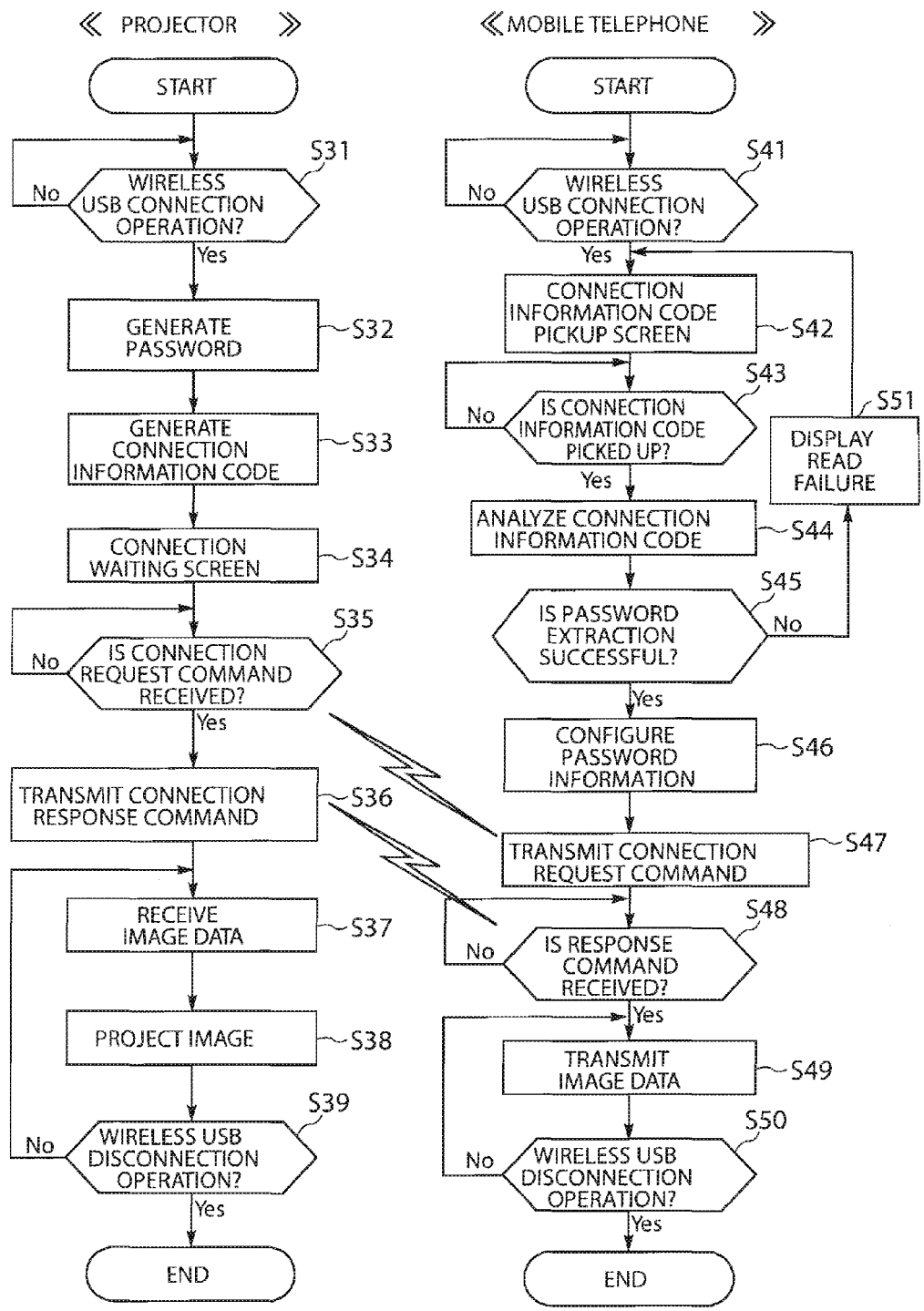
FIG. 7 is a flowchart illustrating a method of connecting the projector and the mobile telephone.

FIG. 7 is a flowchart illustrating a method of connecting the projector and the mobile telephone in the image display system according to Embodiment 2.

The left side of FIG. 7 is a flowchart showing the operation of the projector 150 and the right side thereof is a flowchart showing the operation of the mobile telephone 180 corresponding thereto.

Now, the flow of connecting the projector 150 hanging from the ceiling of the conference room as shown in FIG. 5 and the mobile telephone 180 carried into the conference room using the wireless USB will be described with reference to FIGS. 5 to 7. The initial configuration in the wireless USB including the exchange of the hardware information or the security ID between the both devices is previously completed.

First, the flowchart of the projector 150 will be described. The projector 150 starts up by the starting-up operation of the remote controller 54 and becomes a standby state after initiation.

In a step S31, the control unit 57 waits for an operation for starting the connection with an external mobile terminal device. In particular, the control unit 57 waits for an operation signal from the operation reception unit 55 by performing an operation for starting the connection with the external mobile terminal device by the remote controller 54. When the connection start operation is performed, the method progresses to a step S32. When the connection start operation is not performed, the connection start operation is continuously waited.

In the step S32, the control unit 57 executes the connection establishment Q program stored in the storage unit 58. In particular, the password generating program of the subroutine is executed to generate the password.

In a step S33, the control unit 57 executes the code generating program and generates the connection information code. The connection information code generated in the present embodiment is the QR code (registered trademark).

In a step S34, the control unit 57 allows the image processing unit 63 to generate an image including the generated connection information code and to project the image as a connection standby screen. This state is displayed on the screen SC of FIG. 5. The size when a square cell which is a minimum unit for configuring the QR code (registered trademark) is one pixel of the liquid crystal light valve for determining the resolution of the projected image is set to a minimum size and the connection information code 26 has a size larger than and equal to the minimum size.

In a step S35, the control unit 57 checks whether a connection request command including a password, for requesting the wireless connection, is received from the mobile telephone 180. When the connection request command is received, the method progresses to a step S36. When the connection request command is not received, the connection request command is continuously waited.

In a step S36, the control unit 57 transmits a connection response command for allowing the connection to the mobile telephone 180 through the W communication unit 91.

In a step S37, the control unit 57 receives image data from the connected mobile telephone 180.

In a step S38, the control unit 57 allows the image processing unit 63 to project the received image data.

In a step S39, the control unit 57 checks whether there is a disconnection operation of the remote controller 54 or a disconnection request from the mobile telephone 180. In particular, an operation signal from the operation reception unit 55 or a disconnection request command transmitted through the I/O bridge unit 59 is checked. When the disconnection operation is performed, the communication using the wireless USB is disconnected and a standby state is returned. When the disconnection operation is not performed, the method returns to the step S37.

Subsequently, the flowchart of the mobile telephone 180 will be described.

In a step S41, the Mb control unit 86 waits for an operation for starting the connection with an external projector. In particular, an operation signal from the Mb operation reception unit 89 is waited. When the connection start operation is performed, the method progresses to a step S42. When the connection start operation is not performed, the connection start operation is continuously waited.

As the connection start operation in the present embodiment, for example, when the operation hierarchy of an operation menu of the mobile telephone 180 are displayed, a menu "connection with other device" is first selected and the "icon of a projector" is selected from among the icons of a PC, a projector and a digital TV set.

By this operation, the connection establishment N program is executed. The following steps are executed by this program.

In the step S42, the Mb control unit 86 sets the display unit 81 to a connection information code imaging screen and urges the imaging using the imaging unit 84. The connection information code imaging screen is equal to the connection information code imaging screen (see the display unit 81 of the mobile telephone 80 shown in FIG. 1) according to Embodiment 1. The imaging distance is also equal to that of Embodiment 1.

In a step S43, the Mb control unit 86 checks whether the imaging operation of the connection information code is performed. When the imaging operation is performed, the method progresses to a step S44. When the imaging operation is not performed, the imaging operation is continuously waited.

In the step S44, the Mb control unit 86 executes the code analysis program and analyzes the connection information code included in the taken image.

In a step S45, the Mb control unit 86 checks whether the password is extracted by analyzing the connection information code. When the password is extracted, the method progresses to a step S46. When the password is not extracted, the method progresses to a step S51.

In the step S46, the Mb control unit 86 configures the extracted password in the mobile W communication unit 92. In this step, for example, an operation progress such as "read success" and "under connection" may be displayed, like the screen displayed on the display unit 81 of the mobile telephone 180 shown in FIG. 5. Accordingly, it is possible to improve the user interface.

In a step S47, the Mb control unit 86 transmits the connection request command including the password, for requesting the connection using the wireless USB, to the projector 150.

In a step S48, the Mb control unit 86 checks whether the connection response command for allowing the connection is received from the projector 150. When the connection response command is received, the method progresses to a step S49. When the connection response command is not received, the connection response command is continuously waited. In FIG. 5, the connection using the wireless USB is established at a timing when the connection response command is received.

In a step S49, the Mb control unit 86 transmits the image data to the projector 150 through the mobile W communication unit 92.

In a step S50, the Mb control unit 86 checks whether the disconnection operation of the Mb operation unit 88 is performed. When the disconnection operation is performed, the communication using the wireless USB is disconnected and the standby state is returned. When the disconnection operation is not performed, the method returns to the step S49.

Subsequently, a case where the password cannot be extracted in the step S45 will be described.

In the step S51, the Mb control unit 86 displays a state that the read fails for a predetermined time on the display unit 81 and the method then returns to the step S42. The display of the read failure may be, for example, "Read failure" or "Imaging an image again" so as to display the necessity of the imaging.

In the steps, when an operation for interrupting a process such as a reset operation is performed, the projector 150 and the mobile telephone 180 receives the operation even at any timing.

As described above, according to the present embodiment, the following effects are obtained.

(1) The projector 150 generates the connection information code 26 including the password and projects an image.

Accordingly, the projector 150 and the connection information code 26 including the password forms a pair. Therefore, since it is possible to prevent the connection impossibility due to mismatch between the projector 150 and the connection information (password), it is possible to improve the reliability of the connection.

When the connection information code is imaged by the imaging unit 84, the mobile telephone 180 analyzes the connection information code by the code analysis program and extracts the password. The connection request command including the extracted password is transmitted to access the projector 150. As described above, since the imaging unit is included in the configuration of the general mobile telephone, it is possible to realize the code acquiring unit by the imaging unit which is the existing component. Accordingly, a special hardware configuration is not required in the mobile telephone 180.

When the projector 150 and the mobile telephone 180 are separated from each other, it is possible to establish the connection without movement if the imaging unit 84 can take imaging the connection information code and thus to provide convenience in use.

Accordingly, it is possible to provide the image display system 200 which can reliably establish the connection and has a simple configuration and convenience in use.

(2) Since the W communication unit 91 and the mobile W communication unit 92 are the wireless USB terminal devices corresponding to the wireless USB standard, it is possible to realize high-speed wireless connection based on the wireless USB standard.

Accordingly, it is possible to simply establish a wireless USB system environment by setting the wireless USB terminal devices in the USB ports basically included in the projector 150 and the mobile telephone 180.

Accordingly, it is possible to provide the image display system 200 which can realize the high-speed wireless communication by a simple configuration.

(3) Since the projector 150 newly generates the password which is the random number whenever the wireless communication starts, it is possible to improve the security of the wireless communication in the image display system 200.

Accordingly, it is possible to provide the image display system 200 having excellent security.

(4) Since the connection information code is the two-dimensional code or the three-dimensional code obtained by encoding the password, the connection information code cannot be read by a person although the connection information code is projected and displayed by the projector 150.

Accordingly, it is possible to prevent a third person who participates in a conference from being informed of the password, that is, to prevent information leakage.

Accordingly, it is possible to provide the image display system 200 which can prevent the leakage of the password.

(5) Since the encoding unit is realized by the code generating program for generating the two-dimensional code or the three-dimensional code executed by the projector 150 and the connection establishment Q program including the program, the projector 150 does not require a dedicated hardware configuration for generating the two-dimensional code or the three-dimensional code.

Similarly, since the code analysis unit is realized by the code analysis program for analyzing the two-dimensional code or the three-dimensional code executed by the mobile telephone 180 and the connection establishment N program including the program, the mobile telephone 180 does not require a dedicated hardware configuration for generating the two-dimensional code or the three-dimensional code.

Accordingly, it is possible to provide the image display system 200 having a simple configuration.

(6) Since the image projected by the projector 150 is expanded, visibility is improved. Accordingly, although the mobile telephone 180 is located at a remote place, the connection information code can be imaged if the mobile telephone is separated by a distance for allowing the connection information code 26 in the projected image to be taken the image.

Accordingly, it is convenient to use the image display system 200.

Accordingly, it is possible to provide the image display system 200 which is convenient in use.

The invention is not limited to the above-described embodiments and the above-described embodiments may be variously changed or modified. Now, the modified embodiments will be described.

Modified Embodiment 1

This embodiment will be described with reference to FIG. 3. Although, in Embodiment 1, the operation for starting the connection with the external projector is performed by selecting a hierarchy menu from the "connection with other device" operation menu of the mobile telephone 80, the invention is not limited to this operation.

For example, a barcode read program which is basically mounted in the mobile telephone may start up. In particular, the operation is executed by selecting the "barcode read" from the operation menu of the mobile telephone 80. Accordingly, the connection information code imaging screen in a step S12 is displayed on the display unit 81 of the mobile telephone 80 to become a state that the connection information code can be taken the image.

In this configuration, when the extracted two-dimensional code or the three-dimensional code is the connection information code, the barcode read program includes a subroutine for starting up the connection establishment M program at a timing of identifying the code. This operation is also applicable to the mobile telephone 180 of the image display system 200 according to Embodiment 2. Accordingly, it is possible to provide the image display systems 100 and 200 which are convenient in use.

Modified Embodiment 2

This embodiment will be described with reference to FIG. 7. Although, in Embodiment 2, the password generated by the projector 150 is generated whenever the connection starts (each session), the invention is not limited to this.

For example, the following steps of, at the projector 150, generating a new password in a predetermined period, including the password in the connection response command, and transmitting the connection response command after starting the connection, at the mobile telephone 180, reading the new password from the connection response command and transmitting the connection request command again, and at the projector 150, authenticating the password of the connection request command and transmitting the connection response command again may be included. Accordingly, the password is updated in the predetermined period even in one session.

By this configuration, it is possible to further improve the security of the wireless communication using the wireless USB.

Modified Embodiment 3

This embodiment will be described with reference to FIG. 2. Although, in the embodiments, the image display device is the 3-LCD projector, the invention is not limited to this configuration.

For example, the image display device may be a projector including color filters of red, green and blue which are regularly arranged in a lattice shape as an optical modulation device and a single liquid crystal light valve which can emit full-color modulated light. A projector using a reflective liquid crystal display device or a tilt mirror device as the optical modulation device may be used.

The invention is not limited to the projective projector and, for example, a rear projector including an optical system including an optical modulation device and a projective screen in one individual or a digital TV set may be used.

The digital TV set may include a cathode ray tube, a liquid crystal panel, a plasma display, a surface-conduction electron-emitter display, an organic electroluminescence display as a display unit.

By these configurations, the same effects as the embodiments can be obtained.

Modified Embodiment 4

Although the wireless LAN is used as the predetermined network in Embodiment 1 and the wireless USB is used as the predetermined network in Embodiment 2, the predetermined network may be a technology of establishing a wireless network environment. For example, the predetermined network may be the Bluetooth (registered trademark) environment.

By these configurations, the same effects as the embodiments can be obtained.

What is claimed is:

1. An image display system, in which an image display device forming an image and a mobile terminal device supplying image information are connected with each other via a predetermined network, the image display device comprising:
    a storage unit which stores connection information for connecting to the image display device in the predetermined network;
    an encoding unit which encodes a connection information code including the connection information; and
    a display unit which displays (1) the connection information code or an image including the connection information code, and (2) an instruction to photograph the connection information code or the image including the connection information code, and the mobile terminal device comprising:
    a code acquiring unit comprising an imaging unit which acquires the connection information code from the displayed connection information code or the image including the connection information code by remote imaging;
    a code analysis unit which analyzes the connection information from the acquired connection information code; and a network connection establishment unit which establishes a network connection with the image display device on the basis of the analyzed connection information.

2. The image display system according to claim 1, wherein the predetermined network is any one of a wired and/or wireless local area network (LAN), Bluetooth (registered trademark), and a wireless universal serial bus (USB).

3. The image display system according to claim 1, wherein the connection information includes a plurality of identifiers including a network name or a group name to which the image display device belongs in the predetermined network and/or a password.

4. The image display system according to claim 1, wherein the connection information code is a two-dimensional code or a three-dimensional code.

5. The image display system according to claim 1, wherein the image display device further includes a password generating unit which generates a password for authenticating a counterpart device when the network connection is established.

6. The image display system according to claim 5, wherein the password generating unit generates a new password whenever the network connection is established.

7. The mobile terminal device according to claim 1, wherein the imaging unit remotely images connection information code from the image including the connection information code; and
the code analysis unit analyzes the connection information from the imaged connection information code.

8. An image display device in an image display system including the image display device forming an image and a mobile terminal device supplying image information to the image display device over a predetermined network, the image display device comprising:
a storage unit which stores connection information for connecting to the image display device in the predetermined network;
an encoding unit which encodes a connection information code including the connection information; and
a display unit which displays (1) the connection information code or an image including the connection information code, and (2) an instruction to photograph the connection information code or the image including the connection information code,
wherein the connection information code or the image including the connection information code is displayed before establishing network connection with the mobile terminal device; and
the mobile terminal device comprising:
a code acquiring unit comprising an imaging unit which acquires the connection information code from the displayed connection information code or the image including the connection information code by remote imaging.

9. A method of establishing connection between an image display device forming an image and a mobile terminal device supplying image information to the image display device over a predetermined network, the method comprising:
displaying (1) a connection information code or an image including the connection information code obtained by encoding connection information for connecting to the image display device in the predetermined network and (2) an instruction to photograph the connection information code or the image including the connection information code;
imaging the connection information code at the mobile terminal device by remote imaging with a code acquiring unit comprising an imaging unit;
analyzing the imaged connection information code at the mobile terminal device; and
establishing a network connection with the image display device using the analyzed connection information at the mobile terminal device.

10. The method according to claim 9, wherein the predetermined network is any one of a wired and/or wireless local area network (LAN), Bluetooth (registered trademark), and a wireless universal serial bus (USB).

11. The method according to claim 9, wherein the connection information includes a plurality of identifiers including a network name or a group name to which the image display device belongs in the predetermined network and/or a password.

12. The method according to claim 9, wherein the connection information code is a two-dimensional code or a three-dimensional code.

13. The method according to claim 9, wherein the image display device further includes a password generating unit which generates a password for authenticating a counterpart device when the network connection is established.

14. The method according to claim 13, wherein the password generating unit generates a new password whenever the network connection is established.

* * * * *